US008550136B2

(12) United States Patent
Hunt et al.

(10) Patent No.: US 8,550,136 B2
(45) Date of Patent: *Oct. 8, 2013

(54) WRAP-AROUND TOEGUARD FOR A PNEUMATIC TIRE

(75) Inventors: James Oral Hunt, Akron, OH (US); Michael Christopher Kulton, Wadsworth, OH (US); Paul Bryson Allen, Medina, OH (US); Timothy Lee Fry, Akron, FL (US)

(73) Assignee: The Goodyear Tire & Rubber Company, Akron, OH (US)

( * ) Notice: Subject to any disclaimer, the term of this patent is extended or adjusted under 35 U.S.C. 154(b) by 881 days.

This patent is subject to a terminal disclaimer.

(21) Appl. No.: 12/210,394

(22) Filed: Sep. 15, 2008

(65) Prior Publication Data

US 2009/0020206 A1 Jan. 22, 2009

Related U.S. Application Data

(62) Division of application No. 11/044,752, filed on Jan. 27, 2005, now Pat. No. 7,441,577.

(51) Int. Cl.
*B60C 15/00* (2006.01)

(52) U.S. Cl.
USPC ........... 152/539; 152/546; 152/552; 152/554; 152/543; 152/541

(58) Field of Classification Search
USPC ................ 152/546, 552, 554, 543, 541, 539; 156/539, 541, 542, 546
See application file for complete search history.

(56) References Cited

U.S. PATENT DOCUMENTS

| 4,922,985 | A | | 5/1990 | Gasowski et al. | |
|---|---|---|---|---|---|
| 5,058,649 | A | * | 10/1991 | Hoang et al. | 152/540 |
| 5,524,688 | A | | 6/1996 | Trares et al. | |
| 5,779,829 | A | | 7/1998 | Prakash et al. | |
| 6,126,780 | A | * | 10/2000 | Benzing et al. | 156/406.4 |
| 6,478,064 | B1 | | 11/2002 | Ueyoko | |
| 6,527,025 | B1 | | 3/2003 | Minami | |
| 6,719,030 | B2 | | 4/2004 | Prakash et al. | |
| 6,896,021 | B1 | * | 5/2005 | Kachner et al. | 152/544 |
| 7,441,577 | B2 | * | 10/2008 | Hunt et al. | 152/543 |
| 2002/0162616 | A1 | | 11/2002 | Bernard et al. | |

* cited by examiner

*Primary Examiner* — Katarzyna Wyrozebski Lee
*Assistant Examiner* — Vishal I Patel
(74) *Attorney, Agent, or Firm* — David L King

(57) ABSTRACT

A wrap-around toeguard 18 for a pneumatic tire 10 has a carcass ply 12 or plies 12, 14 with a locked tie-in construction. Each wrap-around toeguard 18 is a non cord reinforced elastomeric unitary strip wound 360.degree. in a singular annular bead. The wrap-around toeguard cord reinforced unitary strip 18 can be formed of a single elastomeric composition having a shore hardness D of greater than 40. Alternatively the wrap-around toeguard may additionally include an apex portion 29 and a chafer portion 27 along with the toeguard portion 28, each portion 27, 29 being co-extruded or otherwise hot formed and shaped with the toeguard portion 28 to form the unitary strip 18 and can have distinct elastomeric composition relative to the toeguard portion 28.

4 Claims, 5 Drawing Sheets

WRAP-AROUND TOEGUARD FOR A PNEUMATIC TIRE

RELATED APPLICATIONS

This application is a Divisional of U.S. application Ser. No. 11/044,752 filed Jan. 27, 2005 now U.S. Pat. No. 7,441,577 entitled "A Locked Bead Pneumatic Tire with Wrap-Around Toeguard".

FIELD OF THE INVENTION

The present invention relates to a pneumatic tire having a carcass reinforced with a high ending turnup and a locked bead construction.

BACKGROUND OF THE INVENTION

The desirability of having the turnup portions of the carcass ply (or plies) of a pneumatic tire extend radially outwardly of the bead core the shortest possible distance is the premise on which prior art locked beads were developed. The proposed advantages included improved bead durability, and reduced material costs.

U.S. Pat. No. 4,922,985, issued May 8, 1990, discloses a carcass ply having a main portion that extends between both bead cores (not shown) of the tire and turnup portions that are anchored around each bead core. Tires according to U.S. Pat. No. 4,922,985 have the radially outer edges of the turnup portions of the carcass ply disposed radially outwardly of the bead cores a minimal distance and are in contact with the main portion of the carcass ply. Suitable elastomeric materials surround the bead core, carcass ply and other elastomeric components to complete the bead portion of the tire. In FIG. 4 of this patent, there is illustrated a clamping member comprised a strip of side-by-side cords of a heat shrinkable material embedded in a suitable elastomeric substance having a permanent thermal shrinkage of at least 2 percent. This strip of cords extended from a location radially and axially inward of the bead core to a location radially outward of the bead core and there was no filler strip or apex disposed between the main portion and turnup portion of the carcass ply.

Tires according to U.S. Pat. No. 4,922,985 were manufactured using a clamping member in which the heat shrinkable material was 1260/2 Nylon 6,6, having a permanent thermal shrinkage of about 4 percent. It is continually the goal in the art to simplify the construction and reduce the expense of building tires, yet improve the durability, handling, rolling resistance and other properties of tires.

In U.S. Pat. Nos. 5,524,688 and 6,719,030 pneumatic tires had two carcass plies or a single carcass ply reinforced with metallic cords, respectively. Each tire had a high ending ply turnup and locked bead construction.

The pneumatic tire 100 of U.S. Pat. No. 6,719,030 as shown in FIG. 7 had a single carcass ply 12 reinforced with parallel metallic cords, each cord composed of at least one filament having a tensile strength of at least (−2000.times.D+ 4400 MPa).times.95%, where D is the filament diameter in millimeters. The turnup portion of the single carcass ply in the bead portion of a pneumatic tire was interposed between the bead core and a toe guard, and the radially outer edge of each turnup portion being in contact with the main portion of the carcass ply and extending to an end point 0.5 to 4.0 inches (12.7 to 101.6 mm) radially outward of the bead core. The toe guard had a first and second end and each end was disposed directly adjacent to the carcass ply. The first end of the toe guard was located on the axially inner side of the main portion of the carcass ply at a location about 0.4 to 3.5 inches (10 to 89 mm) radially outward of the bead core and the second end was located at a point ranging from substantially the axially outermost point of the bead core to a location about 3.5 inches (89 mm) radially outward of the bead core. The first end and second end of the toe guard was a shorter distance from the bead core than the end point of the turnup portion of the carcass ply.

The toe guard may be a rubber material, a flexible textile material or a heat shrinkable material. For example, according to the embodiment illustrated in FIG. 7, the toeguard comprised a strip of side-by-side cords of a non-metallic heat shrinkable material which has a permanent thermal shrinkage of at least 2 percent wrapped circumferentially about the bead core and carcass ply turnup a plurality of times.

When the toeguard was disclosed as a rubber material it was disclosed to be canlendered gum strips circumferentially wound around the bed core and carcass ply turnups a plurality of times.

The use of separate stiffeners or apexes and chafer strips were shown to be used in combination with the plurality of windings of the gum strip used in the toeguard to form the bead portion of the tire.

The uses of multiple windings of strip of material wound around the green or uncured tire to form a carcass in cylindrical form can lead to variations in the rubber thicknesses and gauges around the circumference of the tire as it is shaped toroidally and placed in a mold to cure under temperature and pressure. In particular the area directly under the bead core. These anomalies can create mass imbalances and non-concentric positioning of the tire structure when mounted onto a rim, this resulting in undesirable force variations in tire as it rotates.

The present invention provides a novel way to eliminate the number of strips or rubber components in the bead portion of a tire using a non-cord reinforced toeguard.

The present invention by employing a unitary structure eliminates the non-uniformities created by the use of multiple strips of elastomeric components around the bead.

Thin and thick sections under the bead core and entrapped air problems associated with the use of multiple windings having step offs which create air pockets is eliminated in the tire bead area of the present invention tire.

SUMMARY OF THE INVENTION

A pneumatic tire has a pair of axially spaced apart annular bead cores, at least one cord reinforced carcass ply wrapped around each bead core and having at least one pair of carcass ply turnups substantially contiguous with the at least one carcass ply from the bead core to a radially outer end or ends of the at least one pair of carcass ply turnups; and a wrap-around toeguard associated with each bead core. Each wrap-around toeguard is a non-cord reinforced elastomeric unitary strip wound 360° in a single annular loop. Each wrap-around toeguard has first and second ends wherein each end thereof is disposed directly adjacent to said carcass ply. The first end is located on the axially inner side of the carcass ply at a location about 0.4 inches (10 mm) to 3.5 inches (89 mm) radially outward of the bead core as measured along the carcass ply. The second end is adjacent the turnup of the carcass ply located at a point ranging from substantially the axially outermost point of the bead core to a location about 3.5 inches (89 mm) radially outward of the bead core as measured along the turnup of the carcass ply. The first end and second end of the toeguard are a shorter radial distance from said bead core than a radially outermost end of the at least one turnup of the at least one carcass ply.

In one embodiment a radially inner portion of the second end of the wrap-around toeguard extends from the bead core and the turnup axially outwardly to the outer surface tire. The radially outer portion of the second end of the wrap-around toeguard is overlapped by a radially inner end portion of the sidewall of the tire.

The wrap-around toeguard can be a non-cord reinforced unitary extruded or otherwise shaped strip having a predetermined cross sectional shape formed of a single elastomeric composition having a shore D hardness greater than 40.

Alternatively, the wrap-around toeguard can be a non-cord reinforced extruded strip having two or more elastomeric compositions which are co-extruded or hot formed to form the unitary strip. The wrap-around toeguard second end portion includes an apex portion adjacent the turnup extending along the axially outer side of the turnup and may further include a chafer portion axially outward of the apex portion. This combination of wrap-around toeguard, apex and chafer has three co-extruded elastomeric compositions forming the unitary strip.

In a preferred embodiment the unitary strip of the wrap-around toeguard has an uncured cross sectional profile thicker in the mid-region at the location wherein the bead core is positioned as compared to the ends. When the preferred embodiment tire is cured the wrap-around toeguard has a substantially constant gauge thickness as measured around the circumference of the tire at an axial location or plane passing through the bead core.

The bead core has a radial cross-sectional shape which is selected from the group consisting of substantially pentagonal, hexagonal, rectangular and circular.

When the bead core is substantially pentagonal, it has the greatest axial width of the bead core being located radially outwardly of the radially innermost edge of the bead core and with the radially outermost extent of the bead core being the vertex of two of the sides of the pentagon.

DEFINITIONS

As used herein and in the claims:

"Axial" and "axially" are used herein to refer to lines or directions that are parallel to the axis of rotation of the tire.

"Bead" means that part of the tire comprising an annular tensile member wrapped by ply cords and shaped, with our without other reinforcement elements such as flippers, chippers, apexes, toe guards and chafers, to fit the design of the tire rim.

"Belt structure" means at least two layers of plies of parallel cords, woven or unwoven, underlying the tread, unanchored to the bead, and having both left and right cord angles in the range from about 17 to about 27 degrees with respect to the equatorial plane (EP) of the tire.

"Carcass" means the tire structure apart from the belt structure, the tread and the undertread, but including the beads. The carcass ply includes reinforcing cords embedded in an elastomeric substance and that these components are considered to be a single entity. The "main portion of the carcass ply" means the portion of the carcass ply which extends between the bead cores.

"Cord" means one or more of the reinforcement elements, formed by one or more filaments/wires which may or may not be twisted or otherwise formed and which may further include strands that may or may not be also so formed.

"Crown" means that portion of the tire within the width limits of the tire tread.

"Equatorial plane (EP)" means the plane perpendicular to the tire's axis of rotation and passing through the center of the tire's tread.

"Ply" means a continuous layer of rubber-coated parallel filaments.

"Pneumatic tire" means a laminated mechanical device of generally toroidal shape (usually an open-torous) having beads, a carcass ply and a tread.

"Radial" and "radially" are used to mean directions radially perpendicular from the axis of rotation through the tire.

"Radial-ply tire" means a belted or circumferentially restricted pneumatic tire in which the carcass ply reinforcements which extend from bead to bead are laid at angles between 75.degree. and 105.degree. with respect to the equatorial plane of the tire.

"Rivet" means the open space between cords in a layer.

"Section width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

BRIEF DESCRIPTION OF THE DRAWINGS

The invention will be described by way of example and with reference to the accompanying drawings in which.

DETAILED DESCRIPTION OF THE INVENTION

Figure 1:
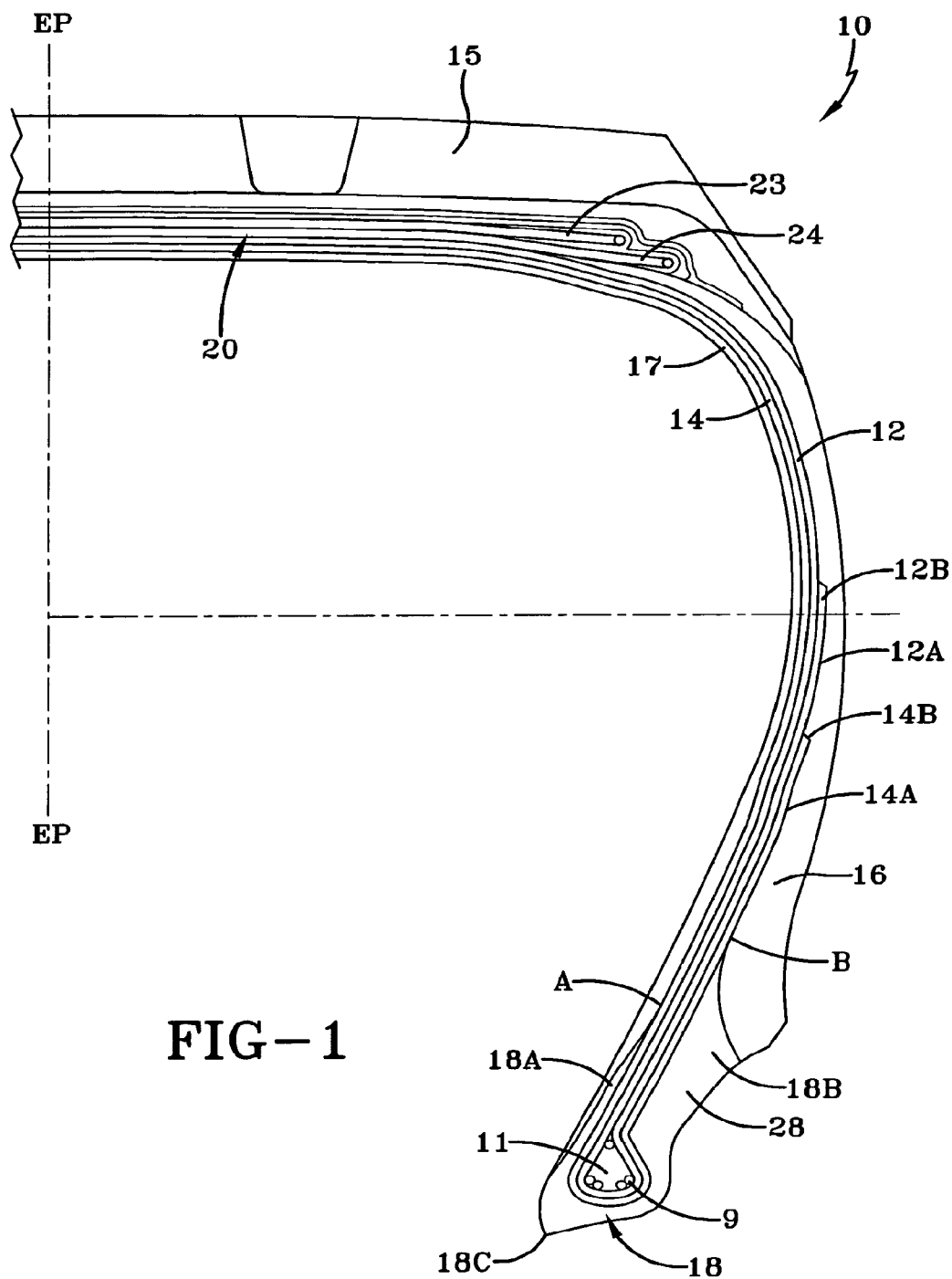
FIG. 1 is one half of a cross-sectional view of the tire according to a first embodiment of the invention.
Figure 2:
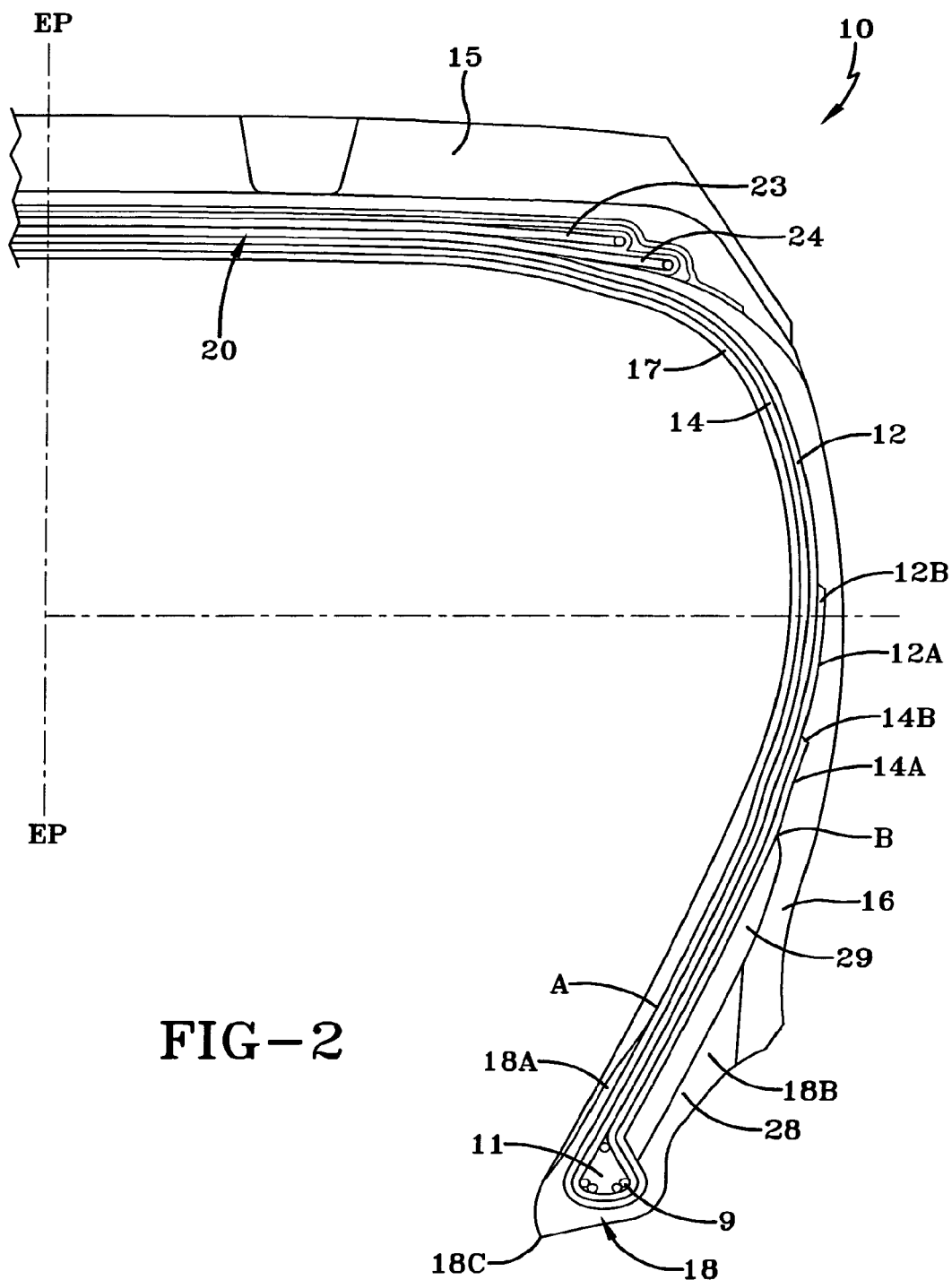
FIG. 2 is one half of a cross-sectional view of the tire according to a second embodiment of the invention.
Figure 3:
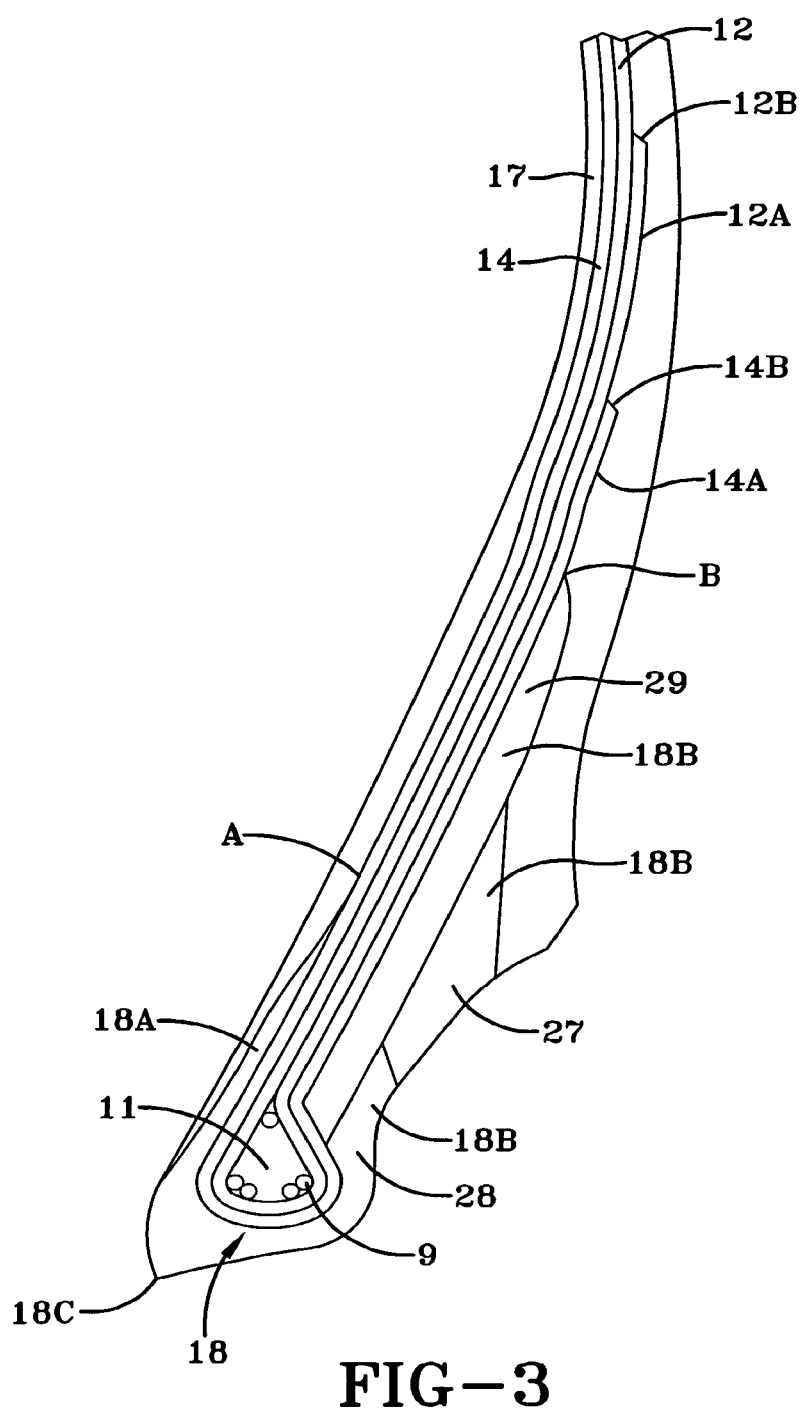
FIG. 3 is an enlarged fragmentary cross-sectional view of a bead portion of a tire according to a third embodiment of the invention.

Referring now to FIGS. 1 and 2, there is shown a cross-sectional view of tires 10 according to a first and second embodiment of the present invention and FIG. 3 shows a third embodiment of the invention an enlarged fragmentary cross-sectional view of a bead portion and lower sidewall mounted upon a rim.

FIG. 1 shows a cross-sectional view of a tire 10 of the present invention. The tire has a pair of bead cores 11 which each comprise a plurality of metallic filaments. The tire 10 is characterized by at least one carcass ply 12, 14 that extends between the bead cores 11 and at least one turnup portion (12a, 14a) anchored around each bead core 11. A belt structure 20 having at least two belts 23, 24 is disposed radially outwardly of the main portion of the carcass ply 12, 14 and a ground engaging tread portion 15 is disposed radially outwardly of the belt structure 20. Sidewall portions 16 extend radially inwardly from the tread portion to the bead portions. On the axially inner side of the carcass ply 14, an innerliner 17 may be used. The innerliner 17 consists of a layer or layers of elastomer or other material that form the inside surface of the tire and contains the inflating fluid, such as air, within the tire 10. It may be desirable to place additional barriers, reinforcement strips or gum strips (not shown) at suitable locations between the innerliner 17 and main portion of the carcass ply 14 to avoid penetration of rubber through the carcass ply 14 during curing. A belt structure 20 comprising a plurality of belt plies 23, 24 is located radially outwardly of the carcass ply 12 or plies 12, 14 in a crown portion of the tire. An elastomeric tread portion 15 is disposed radially outwardly of the belt structure 20. The belt structure has at least two annular layers or plies 23, 24 of parallel cords, woven or unwoven, underlying the tread 15, unanchored to the bead. Generally, the belt structure 20 has both left and right cord angles in the range from 40 to 15.degree. with respect to the equatorial plane of the tire. It is understood that the particular belt structure 20 illustrated in FIGS. 1 and 2 and described herein is merely an example used in the preferred embodiment and that a tire designer may employ any arrangement of belt plies in accordance with the performance requirements of the particular tire while still practicing the present invention. For example, in those instances where a larger tire is being constructed for use in a radial light truck application, three or more belts may be used. In addition, the cords in the belt plies may be rayon, polyester, glass fiber, aramid, steel wire or the like. Preferably, the cord is steel wire having a tensile strength of at least (−1400.times.D+4050).times.95% when D is as described above. Particularly preferred is when the cords are composed of at least one filament having a tensile strength of at least (−2000.times.D+4050).times.95% when D is as described above.

A tire according to the present invention has a pair of axially spaced-apart bead cores 11 which each comprise a plurality of wraps of a single metallic filament 9. Each of the bead cores 11 has a radial cross-sectional shape which may be substantially pentagonal, hexagonal, rectangular or circular. In the instance where the bead has a radial cross-sectional shape which is substantially pentagonal, the greatest axial width of the bead core is located radially outwardly of the radially innermost edge of the bead core. As used herein, a "radial cross section" is a cross section taken in a plane which contains the axis of rotation of a tire or tire and rim assembly. As used herein, "substantially pentagonal" is understood to mean a five-sided cross section, even though some or all of the sides may be curvilinear rather than rectilinear, as in a regular pentagon. The radially outermost extent of the bead core being a vertex of two of the sides of the pentagon and the greatest axial width of the bead core being located radially outwardly of the radially innermost edge of the bead core.

The metallic filament 9 used in the bead cores 11 of the illustrated embodiment is 0.05 inch (1.27 mm) diameter steel wire-coated with bronze to enhance its bonding with rubber. Of course, depending upon the tire size, other filament diameters could be used in practicing the invention.

Each of the bead cores 11 has a radial cross-sectional shape which is substantially pentagonal. For example, in the light truck tire of size LT 245/75R16, each of the bead cores may be fabricated having eight radially superposed layers of wraps of said single metallic filament. The number of wraps in each layer, beginning with the radially innermost layer being 4, 5, 6, 5, 4, 3, 2, 1. For other sizes of tires, different numbers of layers, and wraps in each layer may be used.

The cords of the carcass ply 12 or plies 12, 14 are oriented such that the tire according to the present invention is what is commonly referred to as a radial. The cords may be steel, rayon, polyester or aramid material or any other suitable cord material.

The cords of the carcass ply 12 or plies 12, 14 intersect the equatorial plane (EP) of the tire at an angle in the range of from 75.degree. to 105.degree. Preferably, the cords intersect at an angle of from 82.degree. to 98.degree. The preferred range is from 89.degree. to 91.degree.

The carcass ply 12 or plies 12, 14 and a toe guard 18 are folded about each bead core 11. As mentioned above, the carcass ply 12 or plies 12, 14 have a main portion that extends between the bead cores 11 and turnup portions 12a, 14a that are folded around the bead cores 11. The radially outer edge of each turnup portion 12a is in contact with the main portion of the carcass ply 12 and extends to an end point 12b 0.5 inches (12.7 mm) to 4.0 inches (101.6 mm) radially outward of the bead core 11 from substantially the middle of the bead core, as measured along the main portion of the carcass ply of the tire. Preferably, the turnup portion extends to an end point 12b 0.5 inches (12.7 mm) to 3.5 inches (88.9 mm) radially outward of the bead core 11. The locking in of the bead 11 is achieved by the adhesion between the high turnup 12a or turnups 12a, 14a and the main portion of the carcass ply 12, and the restriction of the flange of rim when the tire is mounted on the rim and inflated as can be seen if only one carcass ply 12 is used or if more than one carcass ply 12, 14 is used the ply 12 closest to the bead core 11 will have the ply turnups 12a, 14a or at least those portions of the turnups contacting that ply directly. As can be seen in FIG. 3, the entire bead construction would be below the top of the rim flange, and the pentagonal shape of the bead compliments the natural pressures between the tire and the rim in holding the bead on the rim when the tire is inflated. This is particularly true when tires employing high inflation, e.g. 50 psi, use the construction of the present invention. The high turnup, and the consequent high area of adhesive contact between the turnup and the main carcass ply, further stabilizes the bead.

A toe guard 18 is associated with each bead core 11. Each toe guard 18 has a first-end 18a and a second end 18b. Each end 18a and 18b is disposed directly adjacent to the carcass ply 12 in a single ply tire 10 or the carcass ply 14 in the two ply tire 10 as shown in FIGS. 1-3. The first end 18a is located on the axially inner side of the main portion of the carcass ply 14 at a location about 0.4 inches (10 mm) to 3.5 inches (89 mm) radially outward of the bead core from substantially the middle of the bead core. Preferably, the first end 18a is located on the axially inner side of the main portion of the carcass ply 14 at a location A about 0.4 inches (10.16 mm) to 2.0 inches (50.8 mm) radially outward of the bead core. The second end 18b of the toe guard 18 is located at a point B ranging from substantially the axially outermost point of the bead core 11 to a location about 3.5 inches (89 mm) radially outward of the bead core from substantially the middle of the bead core, as measured along the turnup portion 12a or 14a of the carcass ply 12 or 14. Preferably, the second end 18b of the toe guard 18 is located at a point B ranging from substantially the axially outermost point of the bead core 11 to a location B about 2.0 inches (50.8 mm) radially outward of the bead core 11.

The carcass ply turnup 12a or turnups 12a, 14a is folded about a pentagonal-shaped bead bundle or core 11 and locked against the main portion of the carcass ply 12 by the sidewall 16. In the illustrated embodiment, the carcass ply 12 with turnup portion 12a terminated at an end point 12b, 4.0 inches (.apprxeq.101 mm), respectively, radially outward of the bead core 11 as measured along the main portion of the carcass ply 12 or plies 12, 14 while the lower ply turnup 14a is terminated at end 14b, 3.0 inches (approx 76 mm) radially outward of the bead core 11 along the main portion of the ply 12 or plies 12, 14.

In the specific illustrated embodiment (see FIG. 1), the axially outer end 18b of toe guard 18 adjacent the turnup 14a is located at a point B 1.6 inches from the midpoint of the bead core 11. The axially inner end 18a of toe guard 18 is located at point A 1.4 inches (25.5 mm) radially outward of the bead toe 18c, as measured generally intersecting and along the main portion of the carcass ply 12 or 14.

The pneumatic tires of the present invention may be designed for various load ranges. For example, the load ranges may be A, B, C, D or E.

A pneumatic radial ply tire according to FIGS. 1 and 2 was manufactured in the size LT 245/75R16.

Figure 4:
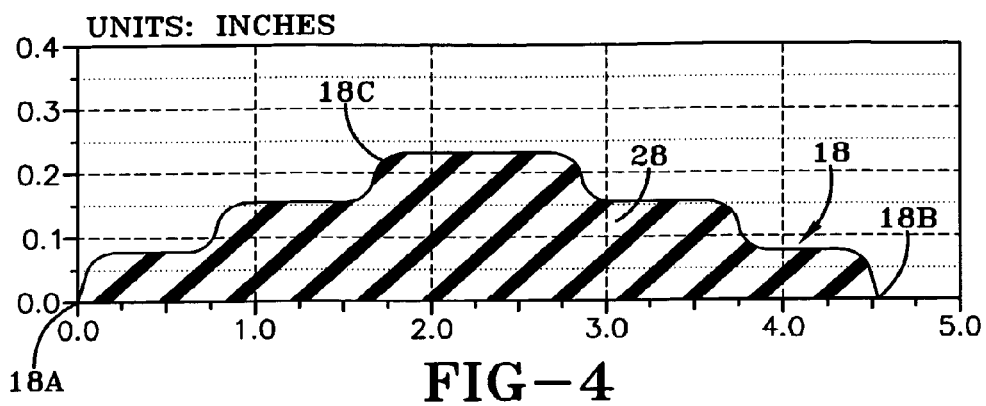
FIG. 4 is a cross-sectional view of the wrap-around toeguard of the present invention formed as a single material unitary strip.

The wrap-around toeguard 18 as illustrated in FIG. 1 is made of a single elastomeric material or composition 28 and when formed this unitary strip may be profiled as shown in FIG. 4. As shown in FIG. 4 the wrap-around toeguard may be designed to have a cross-sectional profile thicker in the center 18c and progressively thinner as it extends away from the bead core 11 toward the ends 18a and 18b. This strip of wrap-around toeguard is non cord reinforced and is preferably formed by extrusion or other shaping means to achieve the desired profile. Unlike using multiple wraps of calendered strips of rectangular cross-section, this wrap-around toeguard can be wound 360.degrees. to form an annular loop that has the ends abuttingly joined or cut on a low angle skive and overlapped while maintaining the general shape or thickness. Preferably the ends are cut diagonally across the wrap-around toeguard strip 18 to insure the splice joint is not localized in a single radial plane. The strip 18 is applied directly onto the cylindrical unvulcanized carcass of the tire 10 prior to shaping the tire toroidally. The ply 12 is placed between bead cores 11 and the wrap-around toeguards 18 and the turnups 12a, 14a with the second ends 18b are folded over the bead cores 11 and stitched to the main portion of the carcass prior to being shaped toroidally and prior to applying the belts 23, 24, and the tread 15.

Figure 5:
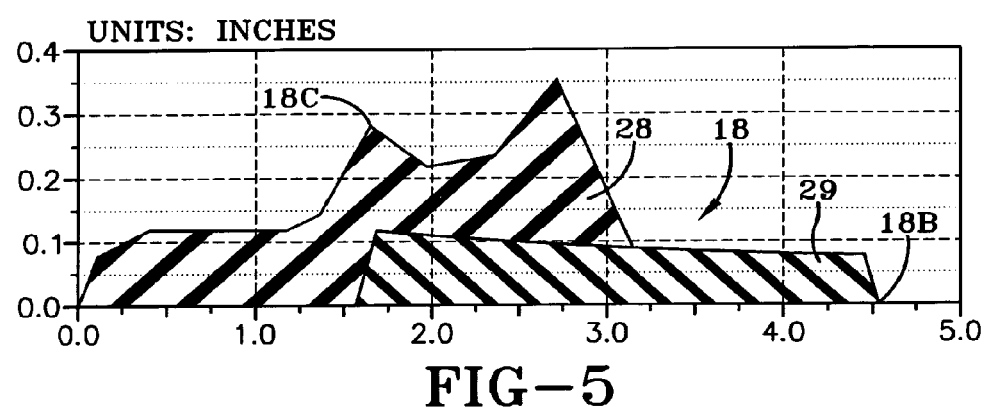
FIG. 5 is a cross-sectional view of the wrap-around toeguard with an apex portion formed as a unitary strip.
Figure 6:
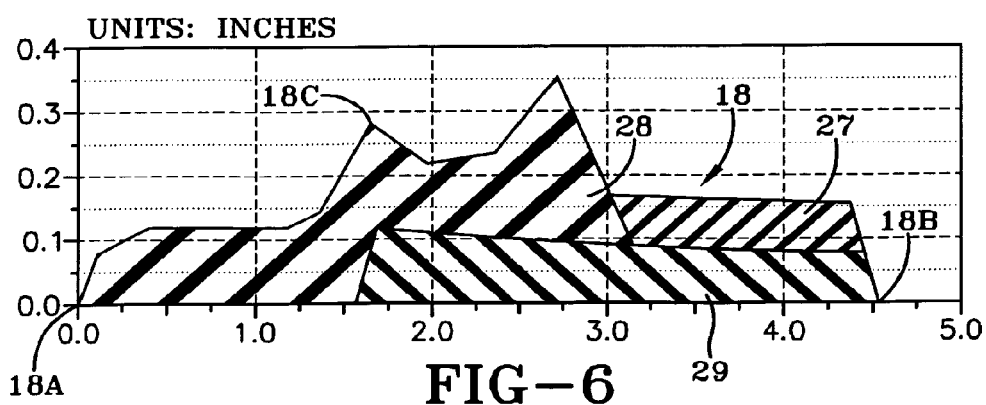
FIG. 6 is a cross-sectional view of the wrap-around toeguard with an apex portion and a chafer portion formed as a unitary strip.
Figure 7:
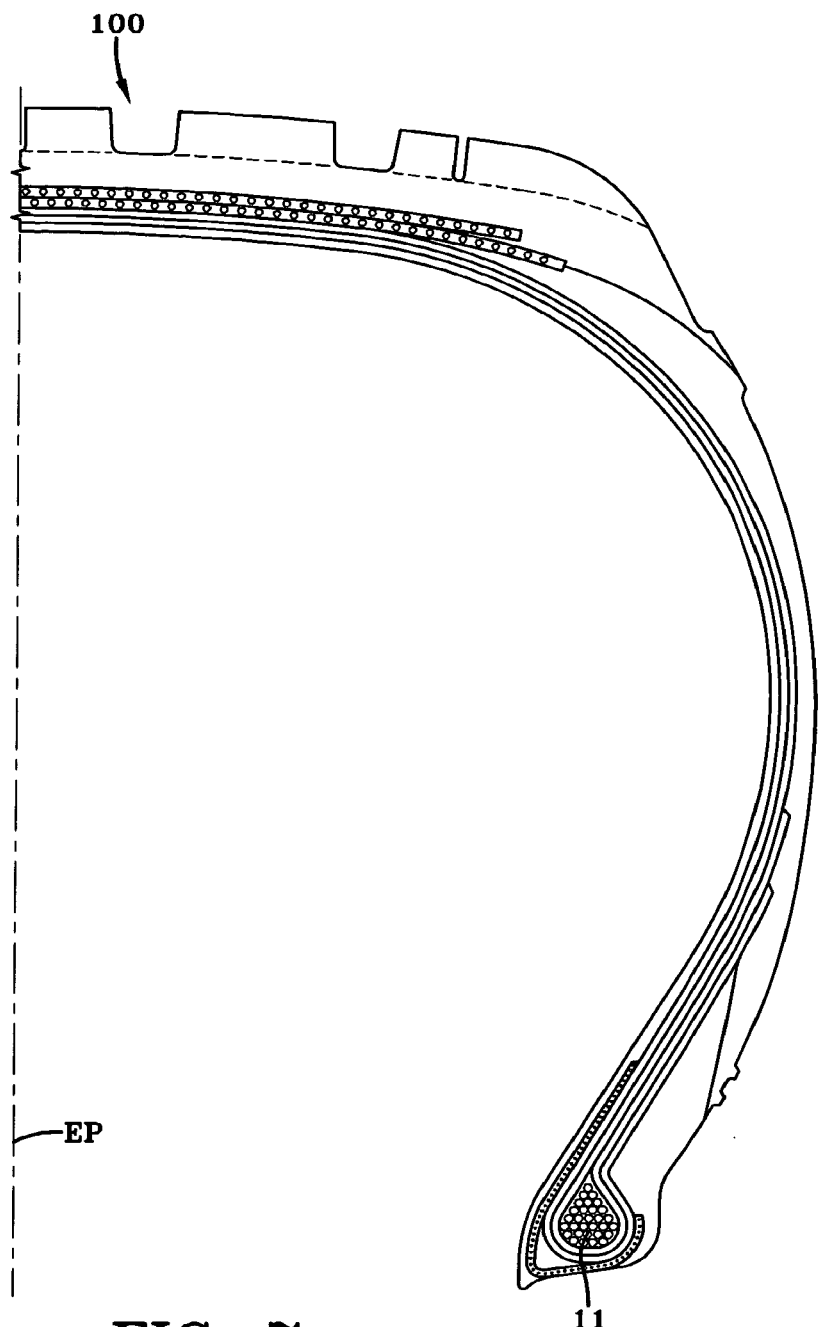
FIG. 7 is a locked bead construction pneumatic tire according to the prior art.

In FIG. 2 the second embodiment tire 10 is shown with basically the same components, however, the wrap-around toeguard 18 is formed with a toeguard portion 28 and an apex portion 29. The apex portion 29 lies adjacent the turnup 12a or 14a depending on the number of plies used extending from the vortex of the bead core a distance of less than 3.5 inches, preferably about 2.4 inches along the turnup. The apex material is stiff preferably having a greater than a shore of 40 stiffness modules. Both the apex portion 29 and the wrap-around toeguard portion 28 are formed and shaped together while hot using co-extrusion or calendered hot forming techniques to achieve the desired profile as illustrated in FIG. 5. The carcass ply 12 or plies 12, 14 are placed on the wrap-around toeguard 18 prior to placing the bead core 11 on a tire building drum not shown. The assembly is then folded over the bead core 11 thereby forming the turnup ends 12a, 14a prior to shaping the tire 10 toroidally and prior to adding the belts 23, 24 and tread 15 and molding the tire in a curing press.

In a third embodiment the wrap-around toeguard 18 may include a chafer portion 27 made of a third material of elastomeric composition. This preferred embodiment has three distinct rubber or elastomeric compositions all hot formed or co-extruded to form a unitary non cord reinforced strip of rubber. This chafer portion 27 as shown in FIG. 3 occupies a space adjacent to where the flange of the rim to which the tire 10 is to be mounted would rub against the tire. This ability to form all these components into a single wrap-around toeguard piece 18 forming one loop both improves the accuracy of placement of the material as well as eliminates the inherent non-uniformities created by using multiple windings of gum strips as was described in the prior art tire of U.S. Pat. No. 6,719,030.

An important feature of the present invention is the fact that the rubber components 27, 28, 29 are formed and shaped together while hot such as in done in a co-extrusion process or by hot forming in calender rollers as described in U.S. Pat. No. 6,126,780 to form a unitary strip 18 as an intermediate article of manufacture. In this way the strip 18 can be most accurately produced and positioned onto the tire carcass during assembly. This further enhances the ability to profile the shape of the strip 18 to achieve a precise amount of uniform rubber directly under and around the bed core 11.

A further advantage is wrap-around toeguard 18 can be made replacing three separate strips of gum, toeguard, chafer and apex and when using co-extrusion or hot forming while maintaining the distinct ability to use specific materials designed for each portion of the toeguard 28, the chafer 27 and the apex 29. In each embodiment the wrap-around toeguard employs non-cord reinforced materials. In some embodiments the specific elastomers used in the manufacture of the toeguard 18 may include short fibers or other fillers for enhanced stiffness or toughness.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An uncured toeguard strip as a component of an uncured tire carcass comprising a unitary strip of toeguard material having an uncured cross sectional profile having a first end, a second end and a mid-region, the profile being thicker in the mid-region at the location wherein a pentagonal shaped bead core is to be positioned with the greatest axial width of the bead core located radially outward of the radially innermost edge of the bead core radially directly over the mid-region and progressively thinner as the strip extends from the mid region toward the ends and the first end is located a distance ranging from 0.4 inches (10.16 mm) to 2.0 inches (50.8 mm) extending outward of the middle and from radially outward of the bead core region and the second end is located a distance ranging up to about 3.5 inches (89 mm) outward of the mid region from the axially outermost point of the bead core to a location B about 2.0 inches (50.8 mm) radially outward of the bead core, wherein the wrap-around toeguard is a non-cord reinforced unitary extruded strip formed of a single elastomeric composition having a shore D hardness greater than 40; and wherein the wrap-around toeguard when cured in a tire has a substantially constant gauge thickness as measured at any location around the circumference of the tire at a particular axial location or plane passing through the bead core.

2. The uncured toeguard strip of claim 1 wherein the wrap-around toeguard is a non-cord reinforced extruded or hot formed strip having two or more elastomeric compositions which are co-extruded or hot formed to form a unitary strip.

3. The uncured toeguard strip of claim 2 wherein the wrap-around toeguard includes an apex portion adjacent the turnup along the axially outer side of the turnup along the second end.

4. The uncured toeguard strip of claim 3 wherein the wrap-around toeguard includes a chafer portion axially outward of the apex portion.

* * * * *